(12) United States Patent
Delle et al.

(10) Patent No.: US 9,078,557 B2
(45) Date of Patent: *Jul. 14, 2015

(54) DISHWASHER WITH SORPTION DRYING DEVICE

(75) Inventors: Daniel Delle, Bächingen (DE); Ulrich Ferber, Holzheim (DE); Helmut Jerg, Giengen (DE); Hans-Peter Nannt, Gerstetten (DE); Kai Paintner, Adelsried (DE)

(73) Assignee: BSH Bosch und Siemens Haugeraete GmbH, Munich (DE)

( * ) Notice: Subject to any disclaimer, the term of this patent is extended or adjusted under 35 U.S.C. 154(b) by 616 days.

This patent is subject to a terminal disclaimer.

(21) Appl. No.: 13/003,879

(22) PCT Filed: Jul. 28, 2009

(86) PCT No.: PCT/EP2009/059693
§ 371 (c)(1),
(2), (4) Date: Jan. 13, 2011

(87) PCT Pub. No.: WO2010/012698
PCT Pub. Date: Feb. 4, 2010

(65) Prior Publication Data
US 2011/0120510 A1 May 26, 2011

(30) Foreign Application Priority Data

Jul. 28, 2008 (DE) .......................... 10 2008 040 789
Aug. 27, 2008 (DE) .......................... 10 2008 039 900

(51) Int. Cl.
*B08B 3/00* (2006.01)
*A47L 15/48* (2006.01)
*A47L 15/42* (2006.01)

(52) U.S. Cl.
CPC ........... *A47L 15/481* (2013.01); *A47L 15/4291* (2013.01); *Y02B 40/44* (2013.01)

(58) Field of Classification Search
USPC .............................. 134/18, 56 D, 57 D, 58 D
See application file for complete search history.

(56) References Cited

U.S. PATENT DOCUMENTS 5,341,848 A 8/1994 Laws
5,529,093 A 6/1996 Gallagher et al.
(Continued)

FOREIGN PATENT DOCUMENTS

DE 3830664 A1 3/1990
DE 10353774 A1 2/2005
(Continued)

OTHER PUBLICATIONS

Machine Translation of Sumida et al., JP 08224201 A, Sep. 1996.*

*Primary Examiner* — David Cormier
(74) *Attorney, Agent, or Firm* — James E. Howard; Andre Pallapies

(57) ABSTRACT

A dishwasher is provided that includes a washing compartment and a sorption drying system to dry items to be washed, wherein the sorption drying system has a sorption container that contains reversibly dehydratable sorption material. The dishwasher further includes an air ducting channel to connect the sorption container with the washing compartment in order to generate an air flow. The air ducting channel has an inlet-side tube section and the sorption container and/or the inlet-side tube section has flow conditioning elements. Each flow conditioning elements has an air passage such that, to a large extent, an equalization of a local cross-sectional profile of an air flow is effected when air flows through the sorption container in a throughflow direction of the sorption container.

22 Claims, 12 Drawing Sheets

(56) References Cited

U.S. PATENT DOCUMENTS

| | | |
|---|---|---|
| 7,585,373 B2 | 9/2009 | Jerg et al. |
| 8,123,869 B2 | 2/2012 | Jerg et al. |
| 8,459,278 B2 | 6/2013 | Jerg et al. |
| 2007/0295373 A1 | 12/2007 | Jerg et al. |

FOREIGN PATENT DOCUMENTS

| | | |
|---|---|---|
| DE | 10353775 A1 | 2/2005 |
| EP | 1674030 A1 | 6/2006 |
| JP | 08224201 A * | 9/1996 |

* cited by examiner

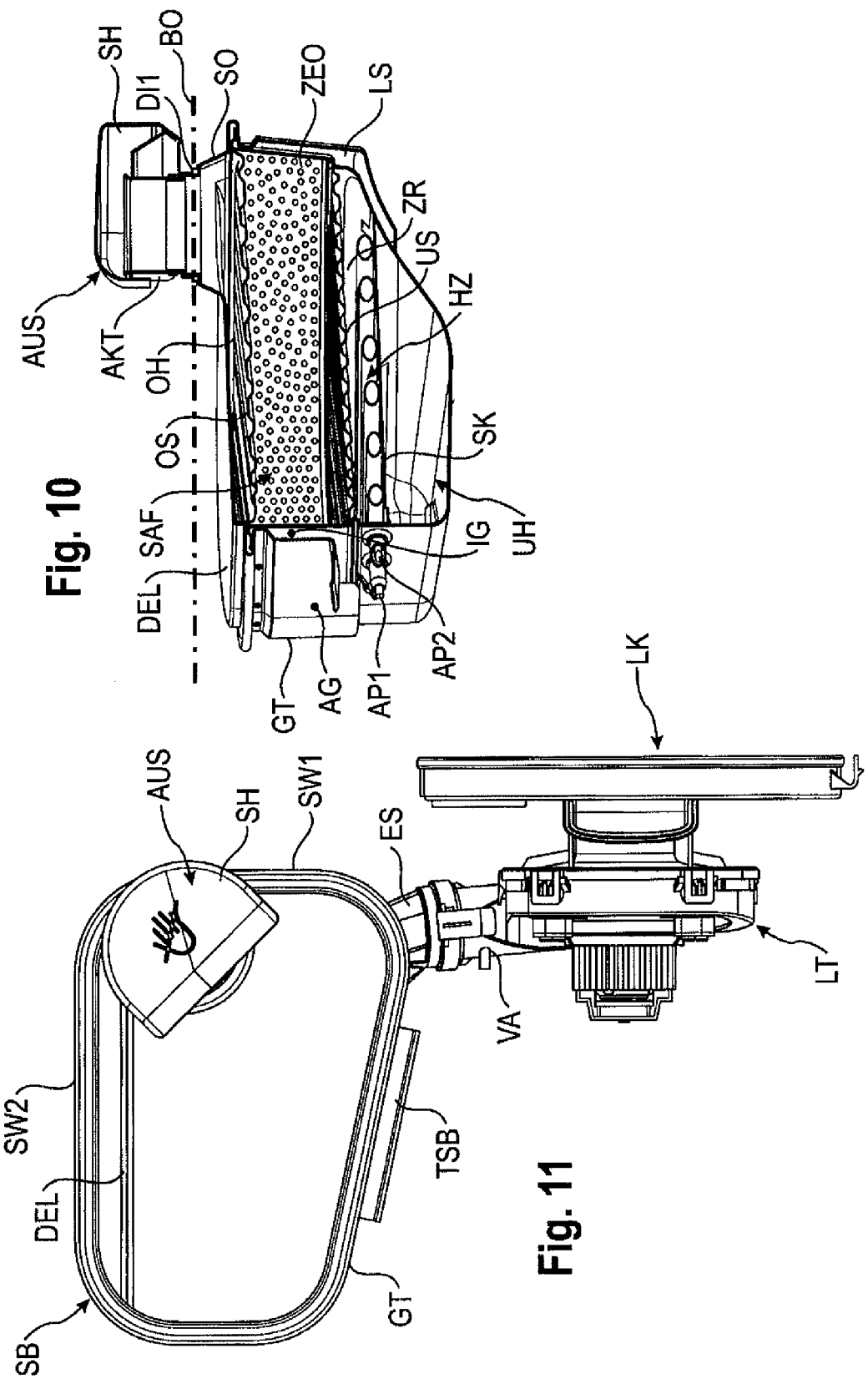

DISHWASHER WITH SORPTION DRYING DEVICE

BACKGROUND OF THE INVENTION

The present invention relates to a dishwasher, in particular a domestic dishwasher, having at least one washing compartment and at least one sorption drying system for drying items to be washed, the sorption drying system having at least one sorption container which contains reversibly dehydratable sorption material and is connected to the washing compartment by means of at least one air ducting channel for the purpose of generating an air flow.

Dishwashers having what is termed a sorption column for drying dishes are known for example from DE 103 53 774 A1, DE 103 53 775 A1 or DE 10 2005 004 096 A1. In the solutions disclosed therein moist air is ducted from the washing compartment of the dishwasher through the sorption column by means of a blower in the "drying" subprogram step of the respective dishwashing program of the dishwasher for the purpose of drying dishes, and owing to the reversibly dehydratable sorption material of the sorption column moisture is extracted from the ducted-through air flow by condensation. For regeneration, that is to say desorption of the sorption column, its reversible dehydratable sorption material is heated to very high temperatures. This causes water stored in said material to escape as hot water vapor which is ducted into the washing compartment by an air flow generated by means of the blower. Washing liquor and/or dishes contained in the washing compartment, together with the air present in the washing compartment, are heated as a result. A sorption column of this type has proved highly advantageous for quiet, energy-saving drying of dishes. DE 10 2005 004 096 A1, for example, discloses a heater which is disposed in the direction of the air flow upstream of the air inlet of the sorption column in order to prevent local overheating of the sorption material during the desorption process. In spite of this "air heating" during the desorption process it is still difficult in practice to dry the reversibly dehydratable sorption material consistently to an adequate and acceptable degree under all conditions.

BRIEF SUMMARY OF THE INVENTION

The object underlying the invention is to provide a dishwasher, in particular a domestic dishwasher, delivering a further improved sorption and/or desorption result for the reversibly dehydratable sorption material of the sorption unit of its sorption drying device.

This object is achieved in the case of a dishwasher, in particular a domestic dishwasher, of the type cited in the introduction in that one or more flow conditioning elements in the sorption container and/or in an input-side tube section of the air ducting channel, in particular after at least one fan unit inserted into the air ducting channel, are provided with one or more air passages in such a way that an equalization of the local cross-sectional profile of the air flow is effected when the air flows through the sorption container in the latter's throughflow direction.

This ensures to a large extent that items to be washed in the washing compartment can be dried in an acceptable, energy-efficient and reliable manner. It also enables the drying device to be compactly accommodated in the dishwasher.

In particular it is ensured to a large extent that moist air that is conducted via the air ducting channel from the washing compartment into the sorption container during the drying cycle desired in each case and flows through said washing compartment's sorption unit containing sorption material can be dried in an acceptable, energy-efficient and reliable manner through sorption by means of the sorption material. Later, following said drying cycle, e.g. during at least one washing or cleaning cycle of a subsequent, newly started dishwashing program, the sorption material can be regenerated, that is to say conditioned, once again in an acceptable, energy-efficient and economical manner through desorption in preparation for a subsequent drying cycle.

Other developments of the invention are disclosed in the dependent claims.

BRIEF DESCRIPTION OF THE DRAWINGS

The invention and its developments are explained in more detail below with reference to drawings, in which.

DETAILED DESCRIPTION OF EXEMPLARY EMBODIMENTS OF THE PRESENT INVENTION

Elements having like function and mode of operation are labeled with the same reference signs in FIGS. 1 to 17.

Figure 1:
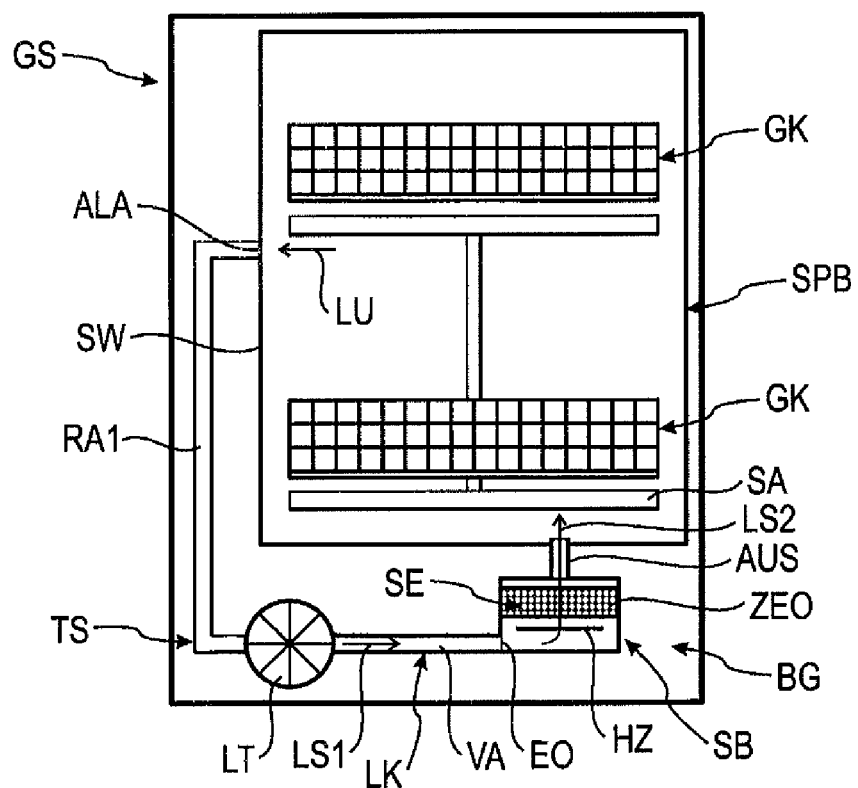
FIG. 1 schematically shows a dishwasher having a washing compartment and a sorption drying system whose components are embodied in accordance with the inventive design principle.

FIG. 1 shows a schematic representation of a dishwasher GS which has as its main components a washing compartment SPB, a base assembly BG disposed thereunder, and a sorption drying system TS in accordance with the inventive design principle. The sorption drying system TS is preferably provided externally, that is to say outside of the washing compartment SPB, partially on a side wall SW and partially in the base assembly BG. As its main components it includes at least one air ducting channel LK, at least one fan unit or blower LT inserted therein, and at least one sorption container SB. Preferably one or more mesh baskets GK for receiving and washing items to be washed, for example kitchen- and tableware, are accommodated in the washing compartment SB. One or more spray devices such as e.g. one or more rotating spray arms SA are provided inside the washing compartment SPB for the purpose of spraying the items to be cleaned with a liquid. In the exemplary embodiment shown here, both a lower spray arm and an upper spray arm are suspended in a rotatable manner in the washing compartment SPB.

In order to clean items to be washed dishwashers run wash programs which have a plurality of program steps. The respective wash program can include in particular the following individual program steps which run sequentially in time: a pre-wash step for removing coarse soiling, a cleaning step with addition of detergent to liquid or water, an intermediate washing step, a rinse step in which liquid or water mixed with rinse aids or surfactants is applied, and a concluding drying step in which the cleaned items to be washed are dried. At the same time, depending on cleaning step or wash cycle of a selected dishwashing program, fresh water and/or process water mixed with detergent is applied to the wash items to be washed in each case, for example for a cleaning cycle, for an intermediate rinse cycle and/or for a final rinse cycle.

Here in the exemplary embodiment the fan unit LT and the sorption container SB are accommodated in the base assembly BG underneath the base of the washing compartment SPB. The air ducting channel LK runs from an outlet opening ALA which is provided above the base BO of the washing compartment SBP and in the side wall SW thereof, externally on said side wall SW by means of an inlet-side tube section RA1 downward to the fan unit LT in the base assembly BG. The outlet of the fan unit LT is connected by way of a connecting section VA of the air ducting channel LK to an inlet opening EO of the sorption container SB close to the base region thereof. The outlet opening ALA of the washing compartment SPB is provided above the base BO thereof preferably in the middle or central region of the side wall SW in order to aspirate air from the inside of the washing compartment SPB. Alternatively thereto it is of course also possible to position the outlet opening ALA in the rear wall RW (see FIG. 2) of the washing compartment SPB. Expressed in general terms, it is particularly advantageous to provide the outlet opening preferably at least above a foam level up to which foam may form during a cleaning cycle, preferably in the upper half of the washing compartment SPB and in one of its side walls SW and/or rear wall. Where appropriate it can also be beneficial to inset a plurality of outlet openings in at least one side wall, top wall and/or the rear wall of the washing compartment SPB and to connect said outlet openings to at least one air ducting channel having one or more inlet openings in the housing of the sorption container SB before the beginning or start of its sorption material section.

The fan unit LT is preferably embodied as an axial fan. It serves to force moist hot air LU from the washing compartment SPB through a sorption unit SE in the sorption container SB. The sorption unit SE contains reversibly dehydratable sorption material ZEO which can adsorb and store moisture from the air LU ducted through it. At the upper side in the region close to the top of its housing the sorption container SB has an outflow opening AO (see FIGS. 4, 5) which is connected to the interior of the washing compartment SPB via an outlet element AUS through a through-opening DG (see FIG. 13) in the base BO of the washing compartment SPB. In this way, during a drying step of a dishwashing program for drying cleaned items, moist hot air LU can be aspirated from the interior of the washing compartment SPB through the outlet opening ALA by means of the activated fan unit LT into the inlet-side tube section RA1 of the air ducting channel LK and conveyed via the connecting section VA into the interior of the sorption container SB for forced aeration of the reversibly dehydratable sorption material ZEO in the sorption unit SE. The sorption material ZEO of the sorption unit SE extracts water from the moist air flowing through it such that downstream of the sorption unit SE dried air can be blown into the interior of the washing compartment SPB via the outlet element or exhaust element AUS. In this way a closed air circulation system is provided by means of said sorption drying system TS. The spatial arrangement of the various components of said sorption drying system TS is evident from the schematic perspective representation of FIG. 2 and the schematic side view of FIG. 3. In FIG. 3, the shape of the base BO is additionally indicated in the drawing by a dash-dotted line to better illustrate the spatial-geometric proportions of the structure of the sorption drying system TS.

The outlet opening ALA is preferably disposed above the base BO at a point which enables a maximum amount of moist hot air LU to be collected from the top half of the washing compartment SPB and aspirated into the air ducting channel LK. This is because following a cleaning cycle, in particular a rinse cycle with heated liquid, moist hot air accumulates by preference above the base BO, in particular in the upper half of the washing compartment SPB. The outlet opening ALA is preferably located at a vertical position above the level of foam that can occur during normal washing operation or in the event of a malfunction. Foam can be caused in particular by detergent in the water during the cleaning cycle. On the other hand the position of the exit point or outlet opening ALA is chosen such that a rising section is still freely available on the side wall SW for the inlet-side tube section RA1 of the air ducting channel LK. Furthermore, positioning the exit opening or outlet opening in the center region, top region and/or upper region of the side wall SW and/or rear wall RW of the washing compartment SPB largely avoids the possibility that water from the sump in the base of the washing compartment or from its liquid spraying system will be sprayed through the outlet opening ALA of the washing compartment SPB directly into the air ducting channel LK and can then get into the sorption container SB, which otherwise could make its sorption material ZEO there unduly damp, partially damage it or render it unusable, or even destroy it completely.

Disposed in the sorption container SB upstream of its sorption unit SE, viewed in the direction of flow, is at least one heating device HZ for desorption and hence regeneration of the sorption material ZEO. The heating device HZ serves to heat air LU that is driven by means of the fan unit LT through the air ducting channel LK into the sorption container. This forced heated air absorbs the stored moisture, in particular water, from the sorption material ZEO as it flows through the sorption material ZEO. This water which is expelled from the sorption material ZEO is conveyed by the heated air via the outlet element AUS of the sorption container SB into the interior of the washing compartment. This desorption process preferably takes place when it is desired to heat liquid for a cleaning cycle or other washing cycle of a subsequent dishwashing program or when said liquid is actually heated. In this case the air heated by the heating device HZ for the desorption process can simultaneously be used for heating the liquid in the washing compartment SPB alone or to assist a conventional water heating means, thereby saving energy.

Figure 2:
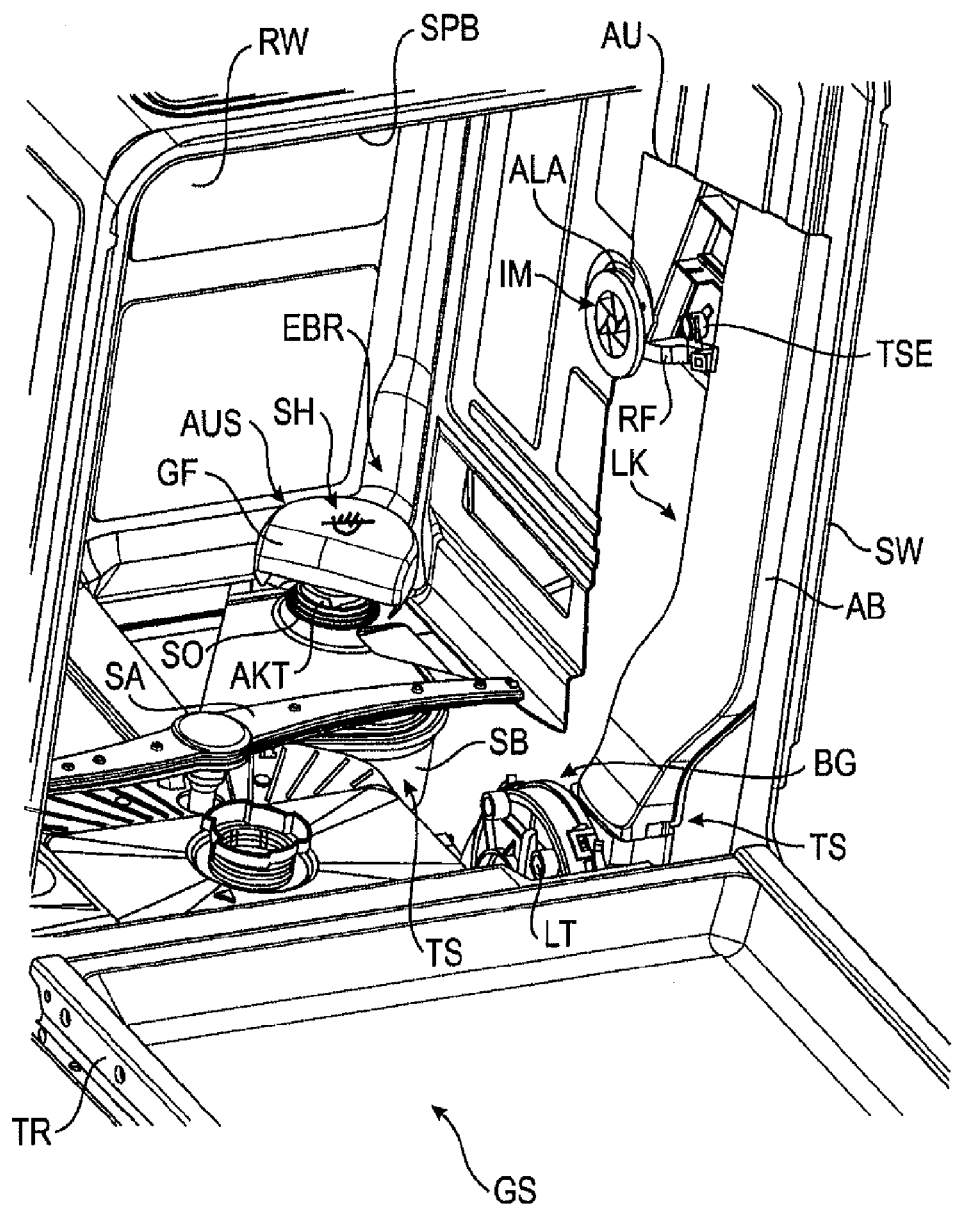
FIG. 2 shows a schematic perspective view of the opened washing compartment of the dishwasher of FIG. 1, with components of the sorption drying system which are drawn partially exposed, that is to say without a cover.
Figure 3:
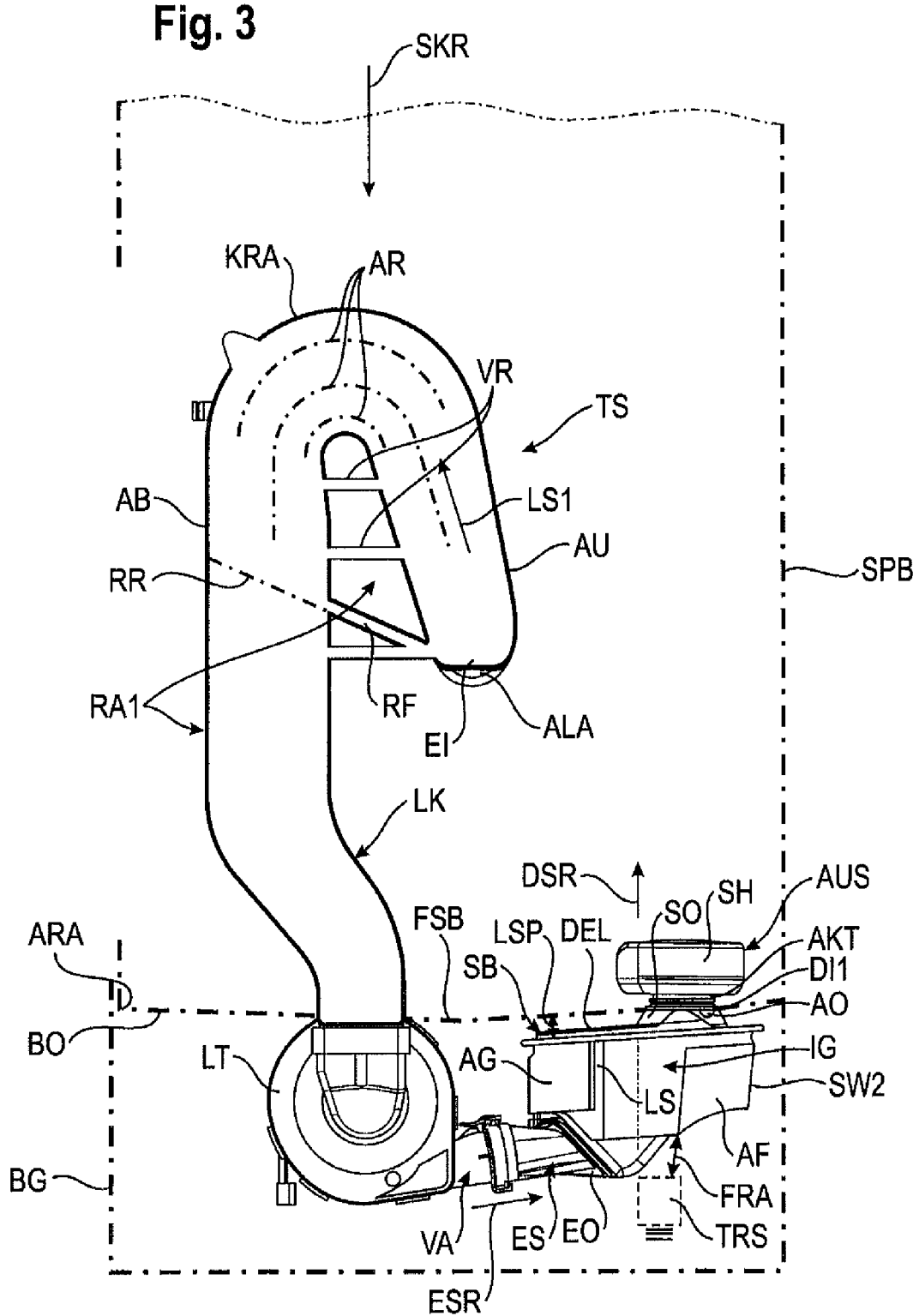
FIG. 3 shows a schematic side view of the entire sorption drying system of FIGS. 1, 2, the components of which are accommodated partially externally on a side wall of the washing compartment and partially in a base assembly underneath the washing compartment, FIG. 4 schematically shows in detail an exploded perspective view of various components of the sorption container of the sorption drying device of FIGS. 1 to 3, FIG. 5 schematically shows a plan view of the sorption container of FIG. 4, FIG. 6 schematically shows in a plan view from below, as a component of the sorption container of FIG. 5, a slotted plate for flow conditioning of air which flows through sorption material in the sorption container, FIG. 7 schematically shows in a plan view from below, as a further detail of the sorption container of FIG. 4, a coiled tube heater for heating sorption material in the sorption container to achieve the desorption thereof, FIG. 8 schematically shows in a plan view from above the coiled tube heater of FIG. 7 which is disposed above the slotted plate of FIG. 6, FIG. 9 schematically shows a sectional side view of the sorption container of FIGS. 4, 5, FIG. 10 schematically shows a perspective view of the internal structure of the sorption container of FIGS. 4, 5, 9 in a partially cutaway state, FIG. 11 schematically shows a plan view from above of the totality of components of the sorption drying system of FIGS. 1 to 10, FIGS. 12 to 14 schematically show various detail views of the outlet element of the sorption drying system of FIGS. 1 to 3.

FIG. 2 shows, with the door TR of the dishwasher GS of FIG. 1 open, main components of the sorption drying system TS in the side wall SW and the base assembly BG partially in the exposed state in a perspective view. Matching this, FIG. 3 shows the totality of the components of the sorption drying system TS, viewed from the side. Starting from the vertical position of its inlet opening EI at the location of the outlet opening ALA of the washing compartment SPB, the inlet-side tube section RA1 of the air ducting channel LK has, with respect to the direction of gravity, an ascending tube section AU and then, with respect to the direction of gravity SKR, a descending tube section AB. The ascending tube section AU runs upward at a slight incline with respect to the vertical direction of gravity SKR and transitions into a curved section KRA that forms a convex bend and forces the inflowing air flow LS1 into a reversal of direction of approximately 180° downward into the following, essentially vertically descending tube section AB. The latter ends in the fan unit LT. The first ascending tube section AU, the curved section KRA and the downstream, second, descending tube section AB form a flat profile channel having an essentially flatly rectangular cross-sectional geometric shape.

One or more flow-guiding ribs or drainage ribs AR are provided in the interior of the curved section KRA and follow the latter's curved shape. In the exemplary embodiment a plurality of curved drainage ribs AR are essentially nested concentrically into one another and disposed at a lateral spacing from one another in the interior of the curved section KRA. Here in the exemplary embodiment they also extend over part of their length into the ascending tube section AU and into the descending tube section AB. These drainage ribs AR are disposed at vertical positions above the outlet ALA of the washing compartment SPB or the inlet EI of the inlet-side tube section RA1 of the air ducting channel LK. Said drainage ribs AR serve to catch droplets of liquid and/or condensate from the air flow LS1 aspirated from the washing compartment SPB. In the region of the ascending tube section AU, the liquid droplets accumulated on the flow-guiding ribs AR can drip off in the direction of the outlet ALA. In the region of the descending tube section AB the liquid droplets can drip off from the flow-guiding ribs AR in the direction of a return rib RR. In this case the return rib RR is provided at a point inside the descending tube section AB which is higher than the outlet opening ALA of the washing compartment SPB and/or higher than the inlet opening EI of the air ducting channel LK. In this case the return rib RR inside the descending tube section AB forms a drainage incline and is axially aligned with a lateral connecting line RF in the direction of the outlet ALA of the washing compartment SPB. At the same time the lateral connecting line RF bridges the intervening space between the arm of the ascending tube section AU and the arm of the descending tube section AB. In this arrangement the lateral connecting line RF interconnects the interior of the ascending tube section AU and the interior of the descending tube section AB. The gradient of the return rib RR and the axially aligned lateral connecting line RF adjoining it is chosen so as to ensure that condensate in the form of condensed water or other liquid droplets which drip off from the drainage ribs AR downward in the region of the descending tube section AB is recirculated into the outlet opening ALA of the washing compartment SPB.

The drainage ribs AR are preferably installed on the inner wall of the air ducting channel LK facing away from the side wall SW of the washing compartment, since the outside of this inner wall of the air ducting channel is cooler than the inner wall of the air ducting channel LK facing the washing compartment SPB. Condensed water precipitates to a greater extent on this cooler inner wall than on the inner wall of the air ducting channel LK which faces the side wall SW. It can therefore suffice if the drainage ribs AR are embodied as web elements which project from the outer inner wall of the air ducting channel LK only over part of the width of the total cross-sectional width of the air ducting channel, which is embodied as a flat profile channel, in the direction of the inside inner wall of the air ducting channel facing the side wall SW, such that a lateral cross-sectional gap remains to allow air to flow through. It may, however, also be beneficial to embody the drainage ribs AR as continuous between the outside inner wall and the inside inner wall of the air ducting channel LK. By this means a more effectively directed ducting of air will be achieved in particular in the curved section KRA. Disruptive air turbulence is largely avoided. A desired air volume can be conveyed in this way through the air ducting channel LK embodied as a flat profile channel.

The return rib RR is preferably installed as a web element on the inside of the outside inner wall of the air ducting channel LK, said web element projecting over a part of the entire width of the flat air ducting channel LK in the direction of its inside inner wall. In this way it is ensured that an adequate through-passage cross-section remains open in the region of the return rib RR for the air flow LS1 to flow through. Alternatively it can of course also be beneficial to provide the return rib RR as a continuous element between the outside inner wall and the inside inner wall of the air ducting channel LK and to provide in particular centrally positioned passage openings for the passage of air.

The drainage ribs AR and the return ribs RR serve in particular also to separate water droplets, detergent droplets, rinse aid droplets and/or other aerosols which are present in the inflowing air LS1 and to convey them back through the outlet opening ALA into the washing compartment SPB. This is particularly advantageous during a desorption process when a cleaning step is taking place at the same time. During said cleaning step a relatively large volume of steam or mist can be present in the washing compartment SPB, due in particular to the spraying of liquid by means of the spray arms SA. Steam or mist of this kind can contain finely distributed water, detergent or rinse aid, as well as other cleaning agents. The drainage ribs AR form a separation device for these finely dispersed liquid particles entrained in the air flow LS1. Alternatively, other separation means, in particular structures having a plurality of corners, such as wire meshes for example, can advantageously also be provided instead of drainage ribs AR.

In particular the upward inclined or essentially vertically ascending tube section AU ensures that liquid droplets or even spray jets which are sprayed out by a spraying device SA such as a spray arm during the cleaning cycle or other wash cycle, for example, are largely prevented from reaching the sorption material of the sorption container directly via the aspirated air flow LS1. Without this retention or separation of liquid droplets, in particular mist droplets or steam droplets, the sorption material ZEO for a sorption process during the drying step could be rendered unduly damp and unusable. In particular it could lead to premature saturation due to infiltration of liquid droplets such as mist droplets or steam droplets, for example. Furthermore, owing to the inlet-side ascending branch AU of the through-channel as well as the one or more separating or intercepting elements in the upper knee or apex region of the curved section KRA between the ascending branch AU and the descending branch AB of the feed-through channel, this largely prevents detergent droplets, rinse aid droplets and/or other aerosol droplets reaching beyond this barrier and downward to the fan LT and from there into the sorption container SB. Instead of the combination of ascending tube section AU and descending tube section AB, and instead of the one or more separating elements, it is of course also possible to provide a differently embodied barrier arrangement having the same function.

To sum up, here in the exemplary embodiment the dishwasher GS has a drying device for drying items to be washed through sorption by means of reversibly dehydratable sorption material ZEO which is stored in a sorption container SE. The latter is connected to the washing compartment SPB via at least one air ducting channel LK for the purpose of generating an air flow LS1. Along its inlet-side tube section RA1 the air ducting channel has an essentially flatly rectangular cross-sectional geometric shape. Viewed in the direction of flow, after its inlet-side tube section RA1, the air ducting channel transitions into an essentially cylindrical tube section VA. It is preferably manufactured from at least one plastic material. It is disposed in particular between a side wall SW and/or rear wall RW of the washing compartment and an outer housing wall of the dishwasher. In this case the air ducting channel LK has at least one ascending tube section AU. It extends upward from the outlet opening ALA of the washing compartment SPB. Furthermore, viewed in the direction of flow, after the ascending tube section AU it has at least one descending tube section AB. At least one curved section KRA is provided between the ascending tube section AU and the descending tube section AB. The curved section KRA has in particular a larger cross-sectional area than the ascending tube section AU and/or the descending tube section AB. One or more flow-guiding ribs AR for equalizing the air flow LS1 are provided inside the curved section KRA. At least one of the flow-guiding ribs AR may extend beyond the curved section KRA into the ascending tube section AU and/or descending tube section AB. The one or more flow-guiding ribs AR are provided in positions above the height of the outlet ALA of the washing compartment SPB. The respective flow-guiding rib AR extends from the channel wall facing the washing compartment housing to the opposite channel wall of the air ducting channel LK facing away from the washing compartment housing, preferably essentially continuously. At least one return rib RR is provided inside the descending tube section AB on the channel wall facing the washing compartment housing and/or channel wall of the air ducting channel LK facing away from the washing compartment housing at a point which is higher than the inlet opening EI of the air ducting channel LK. For condensate recirculation, the return rib RR is connected to the inlet opening EI of the air ducting channel LK via a lateral connecting line RF in the intermediate space between the ascending tube section AU and the descending tube section AB. Said return rib RR slopes toward the inlet opening EI. The return rib extends from the channel wall facing the washing compartment housing to the opposite channel wall of the air ducting channel LK facing away from the washing compartment housing, preferably only over a part of the cross-sectional width.

Referring to FIG. 3, the descending branch AB of the air ducting channel LK is introduced essentially perpendicularly into the fan unit LT. The aspirated air flow LS1 is blown by the fan unit LT on the output side via a tubular connecting section VA into an inlet connector ES of the sorption container SB coupled thereto in the region close to the base of said sorption container. In the process the air flow LS1 flows into the lower region of the sorption container SB in an inflow direction ESR and changes into a different flow direction DSR with which it flows through the interior of the sorption container SB. This throughflow direction DSR runs from bottom to top through the sorption container SB. In particular, the inlet connector ES guides the incoming air flow LS1 into the sorption container DB in such a way that said incoming air flow is deflected from its inflow direction ESR in particular by approximately 90 degrees into the throughflow direction DSR of the sorption container SB.

According to FIG. 3, the sorption container SB is disposed underneath the base BO in a base assembly BG of the washing compartment SPB in a largely freely suspended manner such that it has a predefined minimum clearance gap LS (see also FIG. 10) in relation to adjacent components and/or parts of the base assembly BG in order to provide thermal protection. For the sorption container SB which is installed in a freely suspended manner under the base BO of the washing compartment, i.e. the cover element of the base assembly BG, at least one transportation securing element TRS is provided at a predefined clearance distance FRA such that the sorption container SB is supported from below in case the sorption container SB is displaced downward from its freely suspended position during transportation. At least in the region of its sorption unit SE the sorption container SB has at least one external housing AG in addition to its internal housing IG such that at that point its overall housing is embodied with a double wall. Between the internal housing IG and the external housing AG there therefore exists an air gap LS acting as a thermally insulating layer. Because the sorption container SB is embodied at least partially or entirely with a double wall around the region of its sorption unit SE, in order to adequately protect any adjacent elements and components of the base assembly BG from undue overheating or burning, this provides a further overheating protection measure in addition to or independently of the freely suspended support or installation of the sorption container SB.

Expressed in general terms, the housing of the sorption container SB has a geometric shape such that circumferentially an adequate clearance gap is present in relation to the other parts and components of the base assembly BG in order to provide thermal protection. For example, the sorption container SB has for this purpose on its housing wall SW2 facing the rear wall RW of the base assembly BG a curved shape AF which corresponds to the geometric shape of the rear wall RW facing it.

Figure 13:
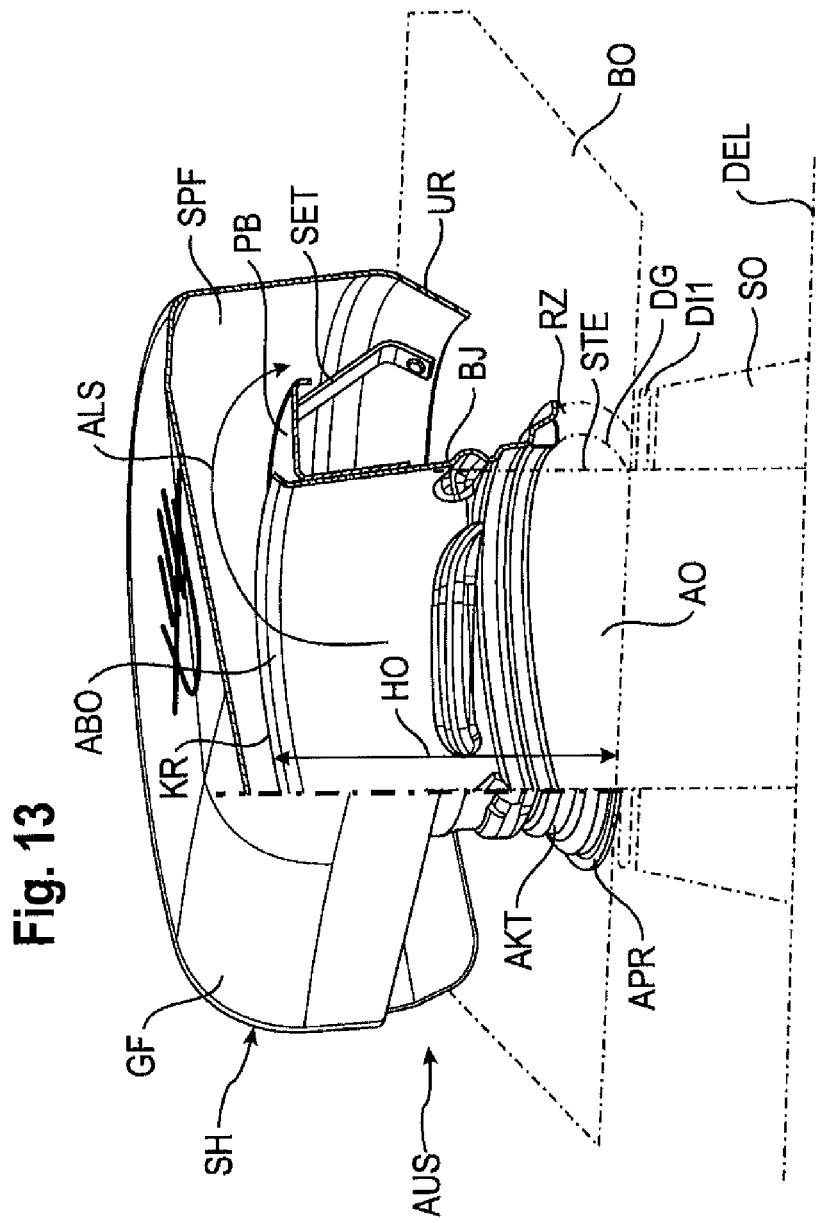

The sorption container SB is mounted on the underside of the base BO, in particular in the region of a through-opening DG (see FIG. 3, 13) of the base BO of the washing compartment SPB. This is illustrated in particular in the schematic side view of FIG. 3. At that point the base BO of the washing compartment SPB has a gradient running from its outer edges ARA toward a liquid collecting area FSB. The sorption container SB is mounted on the base BO of the washing compartment SPB in such a way that its cover part DEL runs essentially parallel to the underside of the base BO and at a predefined gap clearance LSP from said base. For mounting the sorption container SB in a freely suspended manner, a coupling connection is provided between at least one coupling component on the underside of the base, in particular a socket SO, of the sorption container SB and a component on the top side of the base, in particular the outlet element AUS, of the sorption container SB in the region of a through-opening DG in the base BO of the washing compartment SPB. In particular a clamping connection is provided as a coupling connection. The clamping connection can be formed by a releasable connection, in particular a screw connection, with or without bayonet lock BJ (see FIG. 13) between the component of the sorption container SB on the underside of the base and the component of the sorption container SB on the top side of the base. A peripheral zone RZ (see FIG. 13) around the one through-opening DG of the base BO is clamped between an outlet component on the underside of the base, such as SO of the sorption container SB for example, and the outlet element or spray protection component AUS disposed above the base BO. In FIG. 13, for the sake of drawing simplicity the base BO and the lower part on the underside of the base are indicated simply by dash-dotted lines. The outlet component on the underside of the base and/or the spray protection component AUS on the upper side of the base projects with its front end section through the through-opening DG of the base BO. The base-side outlet part has a socket SO around the outlet opening AO of the cover part DEL of the sorption container SB. The spray protection component AUS on the top side of the base has an outflow connector AKT and a spray protection hood SH. At least one sealing element DI1 is provided between the component AUS on the top side of the base and the component SO on the underside of the base.

To sum up, the sorption container SB is therefore disposed effectively freely suspended underneath the base BO of the washing compartment SPB so that for thermal protection it has a predefined minimum gap clearance LSP in relation to adjacent components and parts of the base assembly BG. In addition a transportation security element TRS is permanently fixed to the base of the base assembly at a predefined clearance distance FRA. This transportation security element TRS serves to support from below where necessary the sorption container mounted in a freely suspended manner underneath the base BO of the washing compartment SPB if said sorption container swings downward together with the base BO due to vibrations during transportation for example. This transportation security element TRS can be formed in particular by an inverted U-shaped metal bracket that is permanently attached to the base of the base assembly. The sorption container SB has the outflow opening AO at the top of its cover part DEL. An upwardly projecting socket SO is fitted around the outer rim of this outflow opening AO. A cylindrical socket connecting element STE (see FIGS. 4, 5, 9, 13) which projects upward and acts as a mating part for the outflow connector or exhaust flue connector AKT to be attached to it, is mounted in the approximately circular opening of this socket SO. It preferably has an external thread with integrated bayonet lock BJ that interacts accordingly with the internal thread of the exhaust flue connector AKT. On its top-side seating edge running concentrically around the socket connecting element STE the socket SO has the sealing ring DI1. This is illustrated in FIGS. 3, 4, 9, 13. In this case the sorption container SB lies firmly pressed with this sealing ring DI1 to the underside of the base BO. It is maintained at a distance or clearance LSP from the underside of the base BO by the height of the socket SO. From the top side of the base BO the exhaust flue connector AKT is inserted downward through the through-opening DG of the base BO and screwed to the mating socket connector STE and secured against opening by the bayonet lock BJ. Here the exhaust flue connector AKT lies tightly against a circumferential outer peripheral zone RZ of the base BO around the through-opening DG with an annular outer edge APR. The outer peripheral zone RZ of the base BO around the through-opening DG is clamped and sealed in a liquid-tight manner between a circumferential lower supporting edge APR of the exhaust flue connector AKT and the upper supporting edge of the socket AO by means of the sealing ring DI1 disposed at that point. Since the sealing ring DI1 presses onto the base from the underside, it is protected against ageing due to any impairment or damage caused by detergents in the washing solution. A liquid-tight through connection between the exhaust flue connector AKT and the socket SO is formed in this way. Advantageously, this functions simultaneously as a suspension device for the sorption container SB.

Because the socket SO projects upward by a socket height LSP from the remaining surface of the cover part DEL it is ensured that a gap clearance exists between the cover part DEL and the underside of the base BO. Here in the exemplary embodiment of FIG. 3, the base BO of the washing compartment SPB runs, starting from its circumferential peripheral zone with the side walls SW and the rear wall RW, with a gradient in an obliquely inclined manner toward a preferably central liquid-collecting region FSB. The pump sump PSU of a circulating pump UWP can be located thereunder (see FIG. 16). In FIG. 3, this base BO running from the outside inward at an incline toward the lower lying collecting region FSB is drawn in with dash-dotted lines. The arrangement of the pump sump PSU with the circulating pump UWP placed therein underneath the lower lying collecting region FSB is clear from the plan view of the base assembly BG in FIG. 16. The sorption container SB is preferably mounted on the base BO of the washing compartment SPB such that its cover part DEL runs essentially parallel to the underside of the base BO at a predefined gap clearance LSP therefrom. To that end the socket SO is placed on the socket connector STE sitting therein obliquely at an appropriate angle of inclination relative to the surface normal of the cover part DEL.

According to FIGS. 4 to 10, the sorption container SB has a pot-shaped housing part GT that is closed by means of a cover part DEL. In the pot-shaped housing part GT there is provided at least the sorption unit SE containing reversibly dehydratable sorption material ZEO. The sorption unit SE is accommodated in the pot-shaped housing part GT in such a way that its sorption material ZEO can essentially be aerated in or against the direction of gravity by an air flow LS2 which is produced by deflecting the air flow LS1 generated via the air ducting channel LK. The sorption unit SE has at least one lower sieve or grid element US and at least one upper sieve or grid element OS at a predefined vertical distance H from one another (see in particular FIG. 9). The spatial volume between the two sieve or grid elements US, OS is effectively completely filled with the sorption material ZEO. At least one heating device HZ is provided in the pot-shaped housing part GT. Said heating device HZ is, viewed in the throughflow direction DSR of the sorption container SB, provided in the pot-shaped housing part GT in particular upstream of the sorption unit SE containing the reversibly dehydratable sorption material ZEO. The heating device HZ is provided in a lower cavity UH of the pot-shaped housing part GT for collecting inflowing air LS1 from the air ducting channel LK. The inlet opening EO for the air ducting channel LK is provided in the pot-shaped housing part GT. The exit opening AO for the outlet element AUS is provided in the cover part DEL. A heat-resistant material, in particular metal sheet, preferably high-grade steel or a high-grade steel alloy, is preferably used for the cover part DEL and the pot-shaped housing part GT. The cover part DEL closes off the pot-shaped housing part GT to a large extent hermetically. The circumferential outer edge of the cover part DEL is connected to the upper edge of the pot-shaped housing part GT only by a mechanical connection, in particular by a deforming connection, a joining connection, a latching connection, a clamping connection, in particular by a beaded connection or a clinched connection. The pot-shaped housing part GT has one or more side walls SW1, SW2 (see FIG. 5) which run essentially vertically. Said housing part GT has an external contoured shape which corresponds essentially to the internal contoured shape of an installation area EBR provided for it, in particular in a base assembly BG (see FIG. 16). The two adjacent side walls SW1, SW2 have external surfaces which run essentially at right angles to one another. At least one side wall, such as e.g. SW2, has at least one shaped section such as e.g. AF which is embodied in an essentially complementary manner to match a shaped section on the rear wall and/or side wall of the base assembly BG, which is provided under the base BO of the washing compartment SPB. The sorption container SB is provided in a rear corner area EBR between the back wall RW and an adjacent side wall SW of the dishwasher machine GS, in particular the base assembly BG thereof.

Figure 4:
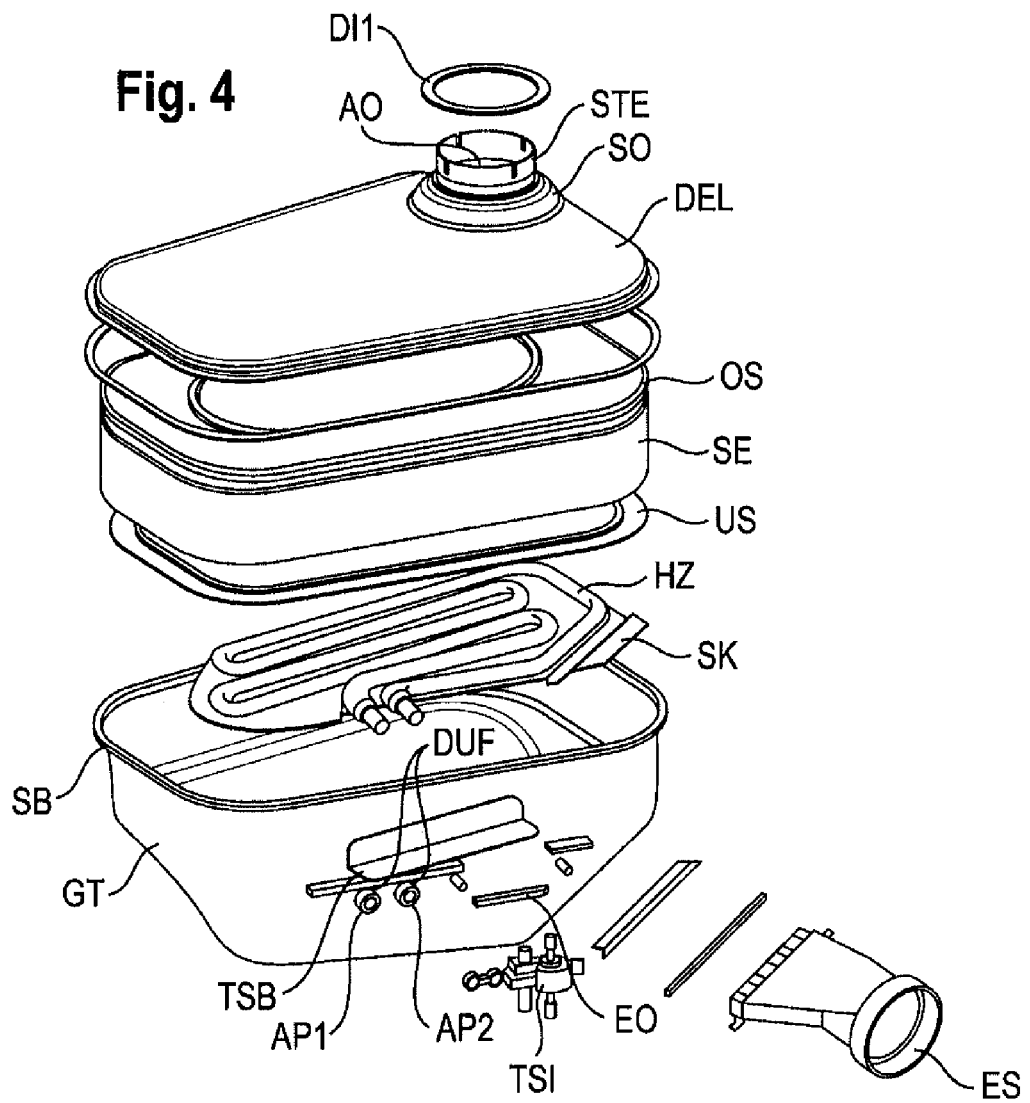
Figure 5:
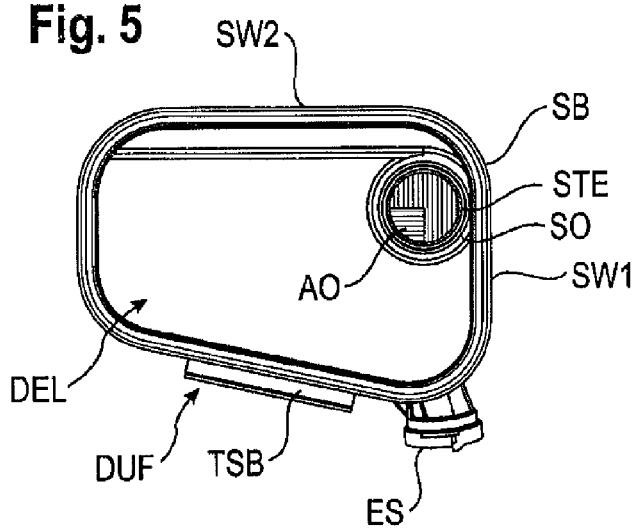
Figure 9:
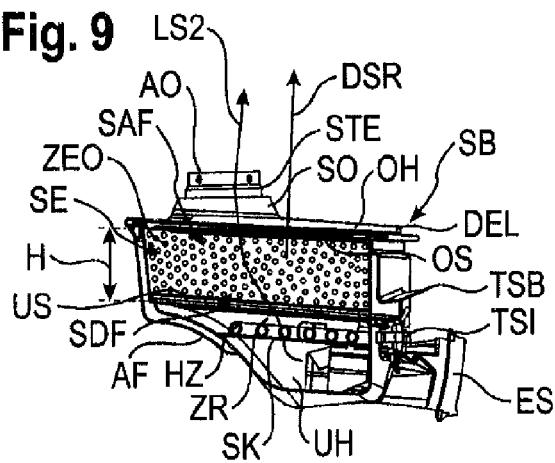
Figure 8:
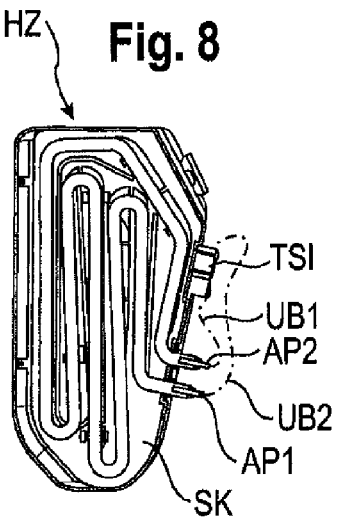
Figure 6:
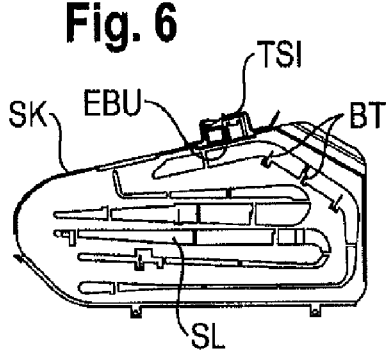
Figure 7:
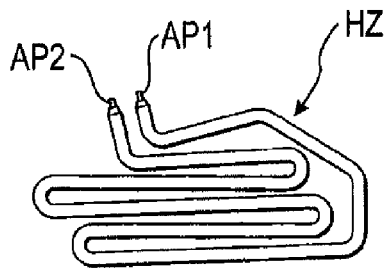
Figure 12:
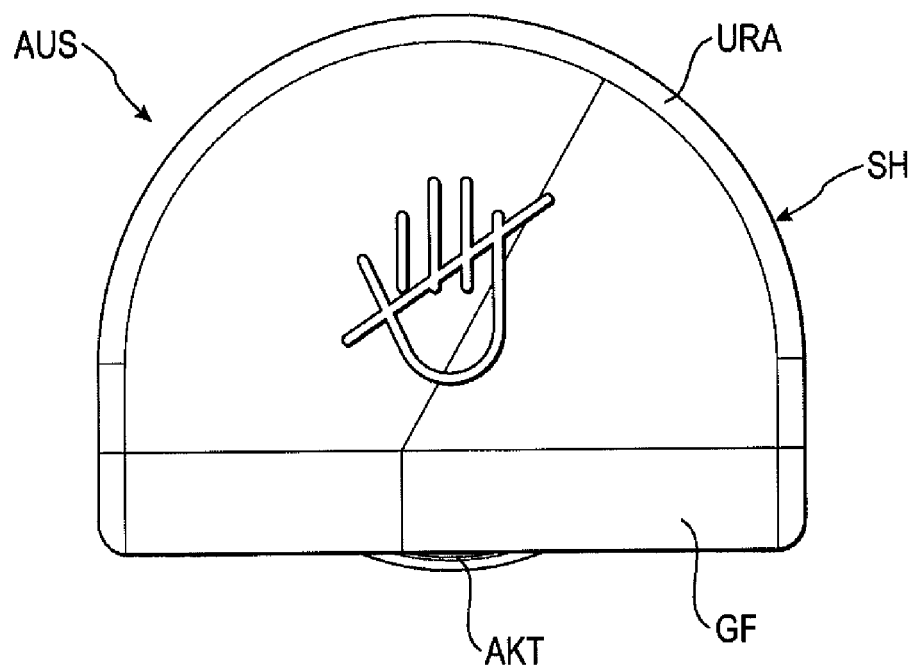

The pot-shaped housing part GT has at least one through-opening DUF for at least one electrical contact element AP1, AP2 (see FIG. 4). A drop protection plate TSB is mounted in a canopy region above the through-opening DUF at least over its extension. The drop protection plate TSB has a drainage incline.

FIG. 4 shows in a schematic and perspective exploded view the various components of the sorption container SB in the disassembled state. The components of the sorption container SB are arranged in multiple positional planes one above the other. This structural design, layered from bottom to top, of the sorption container SB is illustrated in particular in the sectional view of FIG. 9 and in the cutaway perspective representation of FIG. 10. The sorption container SB has the lower cavity UH close to the base for collecting inflowing air from the inlet connector ES. Above this lower cavity UH sits a slotted plate SK which serves as a flow conditioning means for a coiled-tube heater HZ disposed thereabove. The slotted plate SK sits on a circumferential supporting edge around the interior of the sorption container SB. This supporting edge has a predefined vertical distance relative to the inner base of the sorption container SB for forming the lower cavity UH. The slotted plate SK preferably has one or more clamping parts in order to enable it to be clamped laterally or on the side to a partial surface to at least one inner wall of the sorption container SB. A reliable and secure mounting in position of the slotted plate SK can be provided by this means. In accordance with the view of the slotted plate from below of FIG. 6, this slotted plate has slots SL which essentially trace the course of the coil of the coiled-tube heater disposed over the slotted plate. The slots or passages SL of the slotted plate SK are embodied larger, in particular wider or broader, at those locations at which the air flow LS1 entering the sorption container SB has a lower velocity in the throughflow direction DSR through the sorption container SB than at those locations at which the air flow LS1 entering the sorption container has a greater velocity in the throughflow direction DSR through the sorption container SB. This achieves to a large extent an equalization of the local flow cross-sectional profile of the air flow LS2 which flows through the sorption container SB from bottom to top in a throughflow direction DSR. Within the scope of the invention, equalization of the local flow cross-sectional profile of the air flow is understood in particular to mean that essentially the same volume of air passes through with approximately the same flow velocity essentially at every entry point of a throughflow surface.

Viewed in the throughflow direction DSR, the coiled tube heater RZ is disposed at a predefined vertical distance behind the slotted plate SK. To achieve this, it can be held by means of a multiplicity of plate parts BT which are embodied in a web-like manner at a vertical distance above the passages SL. These plate parts BT (see FIG. 6) support preferably alternately from below and from above the run of the coiled-tube heater. This makes it possible firstly for the coiled-tube heater HZ to be reliably secured in position above the slotted plate SK. Secondly, warping of the slotted plate SK which can occur due to the heat generated by the coiled-tube heater HZ is largely avoided. Viewed in the throughflow direction DSR, the coiled-tube heater HZ is followed by a free intermediate space ZR (see FIG. 9) until the air flow LS2 essentially ascending from bottom to top enters the inlet cross-sectional area SDF of the sorption unit SE. On the inlet side said sorption unit SE has a lower sieve element or grid element US. An outlet-side upper sieve element or grid element OS is provided at a vertical distance H from this sieve element or grid element US. For the two sieve elements US, OS, supporting edges are provided in portions of or all around the inner walls of the sorption container in order to position and to hold the sieve elements US, OS at their assigned vertical position. The two sieve elements US, OS are preferably disposed parallel to one another at this predefined vertical distance H. Between the lower sieve element US and the upper sieve element OS, the sorption material ZEO is filled such that the volume between the two sieve elements US, OS is largely completely filled. When the sorption container SB is in the installed state, the inlet-end sieve element US and the outlet-end sieve element OS are disposed, relative to the vertically running central axis of the sorption container SB and relative to the through-flow direction DSR thereof, in essentially horizontal positional planes above one another at the predefined vertical distance H from one another. In other words, here in the exemplary embodiment the sorption unit SE is therefore formed by a filling volume of sorption material ZEO between a lower sieve element US and an upper sieve element OS. Viewed in the throughflow direction DSR, the upper cavity OH for collecting outflowing air is provided above the sorption unit SE. This outflowing air LS2 is guided by the outlet AO of the socket connector STE into the exhaust flue connector ATK, from where it is blown out into the interior of the washing compartment SPB.

Flow conditioning or flow influencing of the flow LS2 ascending from bottom to top in the throughflow direction DSR is accomplished by the slotted plate SK such that essentially the same volumetric air flow flows around the coiled-tube heater at essentially each point of its longitudinal extent. The combination of slotted plate and coiled-tube heater HZ disposed thereabove to a large extent ensures that the air flow LS2 can be heated largely uniformly during the desorption process upstream of the inlet area of the lower sieve element US of the sorption unit SE. The slotted plate at the same time ensures a largely uniform local distribution of the heated volumetric air flow viewed across the inlet cross-sectional area SDF of the sorption unit SE.

In addition to or independently of the slotted plate SK, it can possibly also be beneficial to provide a heating device outside of the sorption container SB in the connecting section between the fan unit LT and the inlet opening of the sorption container SB. Since the average cross-sectional area of this tube-shaped connecting section VA is less than the average cross-sectional area of the sorption container SB for an air flow, the air flow LS1 can to a large extent be uniformly heated for the desorption process already in advance before it reaches the sorption container SB. It may then be possible to omit the slotted plate SK completely.

In particular if the air is heated by means of a heating device in the sorption container SB, it can possibly also be beneficial to provide both upstream and downstream of the heating device HZ, viewed in the throughflow direction DSR of the sorption container SB, at least one flow conditioning element in each case such that the volumetric air flow flowing through the amount by volume of sorption material ZEO after the inlet cross-sectional area SDF of the lower sieve element US is approximately the same at each point. In this way, in particular also during the sorption process during which the heating device HZ is deactivated, i.e. is switched off, it is largely achieved that all the sorption material is to a large extent fully involved in the dehumidification of the throughflowing air LS1. In an analogous manner, in the desorption process in which the throughflowing air LS2 is heated by the heating device HZ, stored water is caused to re-emerge from all the sorption material in the intermediate space between the two sieve elements US, OS such that at all points inside this spatial volume the sorption material ZEO can be made available, substantially fully dried and thus regenerated, for a subsequent drying process.

Here in the exemplary embodiment, the throughflow cross-sectional area SDF of the sorption unit SE in the interior of the sorption container SB is embodied to be greater than the average cross-sectional area of the end-side inlet connector ES of the air ducting channel LK or of the tube-shaped connecting section VA. The through-flow cross-sectional area SDF of the sorption material is preferably embodied to be between 2 and 40 times, in particular between 4 and 30 times, preferably between 5 and 25 times greater than the average cross-sectional area of the inlet connector ES of the air ducting channel LK with which said connecting piece opens into the inlet opening EO of the sorption container SB.

In summary, the sorption material ZEO fills a bulk volume between the lower sieve element US and the upper sieve element OS such that it has the flow inlet cross-sectional area SDF and a flow discharge cross-sectional area SAF substantially perpendicular to the through-flow direction DSR which runs essentially in a vertical direction. The lower sieve element US, the upper sieve element OS and the sorption material ZEO stored therebetween each have penetration areas which are congruent in relation to one another for the throughflowing air LS2. This largely ensures that at each point in the volume of the sorption unit SE, the sorption material thereof can be subjected to approximately the same volumetric flow. During desorption, points of overheating and thus any overloading or other damage to the sorption material ZEO are in this way largely prevented. During sorption this consequently enables uniform absorption of moisture from the moist air that is to be dried and thus optimum use of the sorption material ZEO provided in the sorption unit SE.

Summing up in general terms, it can therefore be beneficial to provide one or more flow conditioning elements SK in the sorption container SB and/or in an inlet-side tube section VA, ES of the air ducting channel LK, in particular downstream of at least one fan unit LT inserted into the air ducting channel LK, with one or more air passages SL such that an equalization of the local flow cross-sectional profile of the air flow LS2 is effected when flowing through the sorption container SB in the throughflow direction DSR thereof, said throughflow direction being directed from bottom to top. Viewed in the throughflow direction DSR of the sorption container SB, at least one flow conditioning element SK is provided in the lower cavity UH thereof at a vertical distance upstream of the heating device HZ. Here in the exemplary embodiment, a slotted plate or perforated plate is provided as the flow conditioning element SK. The slots SL in the slotted plate SK essentially trace the course of the winding of a coiled-tube heater HZ which is positioned as a heating device at a clearance distance above the slots SL in the slotted plate. The slotted plate is arranged essentially parallel to and at a clearance distance from the air inlet cross-sectional area SDF of the sorption unit SE of the sorption container SB. Air passages, in particular slots SL, in the flow conditioning element SK are embodied so as to be larger at those locations at which the air flow LS1 entering the sorption container SB in the throughflow direction DSR of the sorption container SB has a lower velocity than at those locations at which the air flow LS1 entering the sorption container SB in the throughflow direction DSR of the sorption container SB has a higher velocity.

In summary, the sorption drying system TS has the following specific flow conditions in the region of the sorption container SB. The air ducting channel LK is coupled to the sorption container SB in such a way that the entering air flow LS1 opens into the sorption container SB with a direction of inflow ESR and transitions into a throughflow direction DSR which is different therefrom, with which it flows through the interior of the sorption container SB. The outflow direction of the air flow LS2 exiting the sorption container SB essentially corresponds to the throughflow direction DSR. The inlet-side tube section RA1 of the air ducting channel LK opens into the sorption container SB such that its inflow direction ESR is diverted into the throughflow direction DSR of the sorption container SB, in particular by between 45° and 135°, preferably by approximately 90°. Viewed in the direction of flow, upstream of the sorption container SB at least one fan unit LT is inserted into the inlet-side tube section RA1 of the air ducting channel LK for the purpose of generating a forced air flow LS1 in the direction of at least one inlet opening EO of the sorption container SB. The fan unit LT is disposed in the base assembly BG underneath the washing compartment SPB. The through-flow cross-sectional area SDF for the sorption material ZEO in the interior of the sorption container SB is embodied so as to be greater than the passage cross-sectional area of the inlet connector ES of the air ducting channel LK with which said air ducting channel opens into the inlet opening EO of the sorption container SB. The through-flow cross-sectional area SDF of the sorption container SB is preferably embodied so as to be between 2 and 40 times, in particular between 4 and 30 times, preferably between 5 and 25 times, greater than the passage cross-sectional area of the end-side inlet connecting piece ES of the air ducting channel LK with which said air ducting channel opens into the inlet opening EO of the sorption container SB. At least one sorption unit SE comprising sorption material ZEO is accommodated in the sorption container such that air LS1 can flow through the sorption material ZEO substantially in or against the direction of gravity, said air being guided out of the washing compartment SPB into the sorption container SB via the air ducting channel LK. The sorption unit SE of the sorption container SB has at least one lower sieve element or grid element US and at least one upper sieve element or grid element OS at a predefinable vertical distance H from one another, the spatial volume between the two sieve elements or grid elements US, OS being largely completely filled with the sorption material ZEO. The inlet cross-sectional area SDF and the exit cross-sectional area SAF of the sorption unit SE of the sorption container SB are chosen so as to be in particular essentially equal in size. The inlet cross-sectional area SDF and the exit cross-sectional area SAF of the sorption unit SE of the sorption container SB are furthermore beneficially disposed essentially congruently in relation to one another. The sorption container has, viewed in its throughflow direction DSR, at least one layering consisting of a lower cavity UH and a sorption unit SE disposed thereabove, arranged downstream in the throughflow direction DSR. It has in its lower cavity UH at least one heating device HZ. Above its sorption unit SE the sorption container SB has at least one upper cavity OH for collecting outflowing air LS2. The sorption material ZEO fills a bulk volume in the sorption unit SE of the sorption container SB such that a flow inlet cross-sectional area SDF disposed essentially perpendicular to the throughflow direction DSR and a flow exit cross-sectional area SAF disposed largely parallel thereto is formed. In its upper cover part DEL the sorption container has at least one outflow opening AO which is connected with the aid of at least one outflow component AKT via a through-opening DG in the base BO of the washing compartment SPB to the interior thereof.

The sorption material ZEO is advantageously stored in the sorption container SB in the form of the sorption unit SE in such a way that an essentially equal volumetric air flow value can be applied to substantially each entry point to the through-passage cross-sectional area SDF of the sorption unit SE. A reversibly dehydratable material containing aluminum and/or silicon oxide, silica gel, and/or zeolite, in particular type A, X, Y zeolite, is preferably provided, either singly or in any combination, as the sorption material ZEO. The sorption material is provided in the sorption container SB beneficially in the form of a granular solid or granulate comprising a multiplicity of particles having a grain size of essentially between 1 and 6 mm, in particular between 2.4 and 4.8 mm, as a fill, the fill height H of the particles corresponding to at least 5 times their grain size. The sorption material ZEO present as a granular solid or granulate is usefully present in the sorption container with a fill height in the direction of gravity which corresponds to substantially 5 to 40 times, in particular 10 to 15 times the particle size of the granular solid or granulate. The fill height H of the sorption material ZEO is preferably chosen so as to be substantially between 1.5 and 25 cm, in particular between 2 and 8 cm, preferably between 4 and 6 cm. The granular solid or granulate can preferably be composed of a multiplicity of substantially spherical particulate bodies. The sorption material ZEO embodied as a granular solid or granulate advantageously beneficially has an average fill density of at least 500 kg/m$^3$, in particular essentially between 500 and 800 kg/m$^3$, in particular between 600 and 700 kg/m$^3$, in particular between 630 and 650 kg/m$^3$, in particular preferably of approximately 640 kg/m$^3$.

In the sorption container SB, the reversibly dehydratable sorption material ZEO for absorbing a quantity of moisture transported in the air flow LS2 is beneficially provided in a quantity by weight such that the quantity of moisture absorbed by the sorption material ZEO is lower than a quantity of moisture applied to the items to be washed, in particular a quantity of moisture applied in the rinsing step.

It can be beneficial in particular if the reversibly dehydratable sorption material in the sorption container SB is provided in a quantity by weight such that this is sufficient to absorb a quantity of moisture which essentially corresponds to a wetting quantity with which the items to be washed are wetted after the end of a rinsing step. The absorbed quantity of water preferably corresponds to between 4 and 25%, in particular between 5 and 15%, of the quantity of liquid applied to the items to be washed.

The sorption container SB beneficially accommodates an amount by weight of sorption material ZEO of essentially between 0.2 and 5 kg, in particular between 0.3 and 3 kg, preferably between 0.5 and 2.5 kg.

The sorption material ZEO has in particular pores preferably of essentially between 1 and 12 Angstroms, in particular between 2 and 10, preferably between 3 and 8 Angstroms, in size.

It beneficially has a water absorption capacity of essentially between 15 and 40 percent by weight, preferably between 20 and 30 percent by weight of its dry weight.

In particular, a sorption material is provided which is desorbable at a temperature essentially in the range between 80° and 450° C., in particular between 220° C. and 250° C.

The air ducting channel, the sorption container, and/or one or more additional flow-influencing elements are beneficially embodied in such a way that an air flow can be effected through the sorption material for the sorption and/or desorption thereof having a volumetric flow of essentially between 2 and 15 l/sec, in particular between 4 and 7 l/sec.

It can in particular be beneficial if at least one heating device HZ is assigned to the sorption material ZEO, by means of which heating device HZ an equivalent heat output of between 250 and 2500 W, in particular between 1000 and 1800 W, preferably between 1200 and 1500 W can be provided for heating the sorption material for the desorption thereof.

The ratio of heat output of at least one heating device which is assigned to the sorption material for the desorption thereof to the volumetric air flow of the air flow which flows through the sorption material is preferably chosen so as to be between 100 and 1250 W sec/l, in particular between 100 and 450 W sec/l, preferably between 200 and 230 W sec/l.

A through-flow cross-sectional area for the sorption material of substantially between 80 and 800 cm$^2$, in particular between 150 and 500 cm$^2$, is preferably provided in the sorption container.

Beneficially, the fill height H of the sorption material ZEO over the inlet cross-sectional area SDF of the sorption container SB is essentially constant.

It is in particular beneficial to embody the sorption material in the sorption container SB so as to absorb a quantity of water of essentially between 150 and 400 ml, in particular between 200 and 300 ml.

Furthermore, at least one thermal overheating protection device TSI (see FIGS. 4, 6, 8, 9) is provided for at least one component of the sorption drying system TS. Such a component can preferably be formed by a component of the sorption container SB. At least one thermal overheating protection device TSI can be assigned to this component. This thermal overheating protection device TSI is mounted on the outside of the sorption container SB. At least one electrical temperature protection unit TSI is provided as a thermal overheating protection device. Here in the exemplary embodiment it is assigned to the heating device HZ which is accommodated in the sorption container SB.

In the exemplary embodiment of FIGS. 4, 6, 8 and 9, the electrical temperature protection unit is provided in an outside recess EBU on the inner housing IG of the sorption container SB in the region of the vertical position of the heating device HZ. It comprises at least one electrical thermal switch TSA and/or at least one fuse SSI (see FIG. 17). The electrical thermal switch TSA and/or the fuse SSI of the electrical temperature protection unit TSI are each inserted, preferably in series, into at least one electrical power supply line UB1, UB2 of the heating device HZ (see FIG. 8).

It can furthermore be beneficial to provide at least one control device HE, ZE (see FIG. 16) which interrupts the power supply to the heating device HZ in particular in the case of a fault. The exceeding of an upper temperature limit, for example, constitutes a fault situation.

Moreover, the largely free-hanging suspension of the sorption container, in particular underneath the base BO of the washing compartment SPB, can also serve as a thermal overheating protection device.

The thermal overheating-protection device can furthermore include a mounting of the sorption container SB in such a way that the sorption container SB has a predefined minimum gap clearance LSP in relation to adjacent components and/or parts of a base assembly BG.

As a thermal overheating protection device there can be provided in addition to, or independently of, the measures indicated above, at least in the region of the sorption unit SE of the sorption container SB, at least one outer housing AG in addition to the inner housing IG of the sorption container SB. In this case an air gap clearance LS is present as a thermal insulation layer between the inner housing IG and the outer housing AG.

Figure 17:
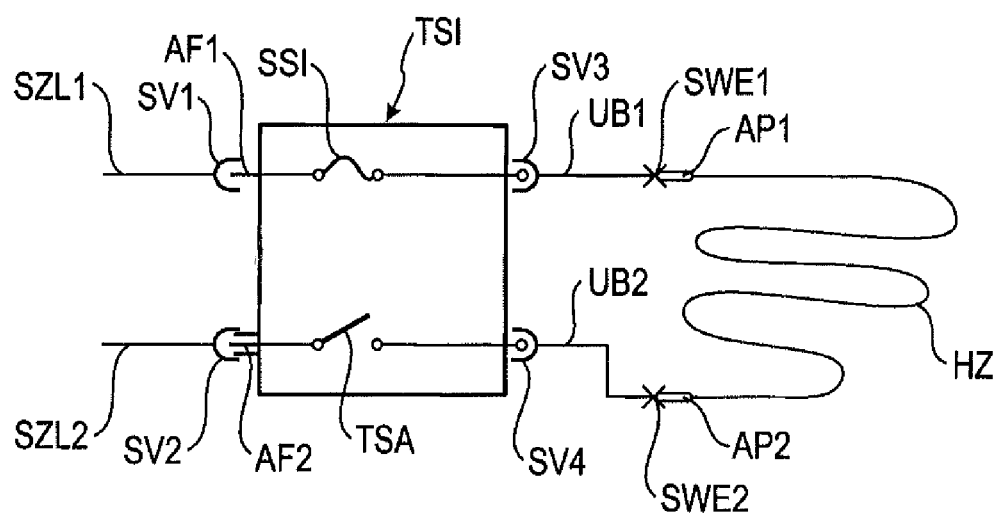
FIG. 17 shows a schematic representation of the thermoelectric overheat protection circuit of the sorption container of FIGS. 4 to 10 of the sorption drying system of FIGS. 1 to 3, 11.

The coiled tube heater HZ of FIGS. 4, 7, 8, 9 has two connection terminals AP1, AP2 which are brought out through corresponding through-openings in the housing of the washing compartment SB. Each connecting terminal or connecting pin AP1, AP2 is preferably connected in series with an overheating protection element. The overheating protection elements are combined in the temperature protection unit TSI which is disposed externally on the housing of the sorption container SB close to the two terminal pins AP1, AP2. FIG. 17 shows the overheating protection circuit for the coiled tube heater HZ of FIG. 8. The first bypass jumper UB1 is attached to the first rigid terminal pin AP1 by means of a welded connection SWE1. The second bypass jumper UB2 is attached to the second rigid terminal pin AP2 in an analogous manner by means of a welded connection SWE2. The bypass jumper UB2 is electrically contacted to the thermal switch TSA by means of a plug connector SV4. The bypass jumper UB1 is electrically connected to the thermoelectric fuse SSI via a plug contact SV3. At the input side, a first power supply lead SZL1 is connected to an external terminal lug AF1 of the fuse element SSI via a plug connector SV1. A second power supply lead SZL2 is connected in corresponding fashion to an external terminal lug AF2 of the thermal switch TSA via a plug connector SV2. In particular, the second power supply lead SZL2 can form a neutral conductor, while the first power supply lead SZL1 can be a "live phase". The thermal switch TSA opens as soon as a first upper temperature limit for the coiled tube heater is exceeded. As soon as the temperature falls below the limit again the thermal switch closes again so that the coiled tube heater HZ heats up again. However, if the coiled tube heater HZ reaches a critical upper temperature limit, which is above the first upper limit, then the fuse SSI melts and the electric circuit for the coiled tube heater HZ is permanently interrupted. The two temperature protection elements of the temperature protection device TSI are largely in intimate, thermally conducting contact with the inner housing IG of the sorption container. They can be separately tripped if certain upper temperature limits specifically assigned to them are exceeded.

Figure 14:
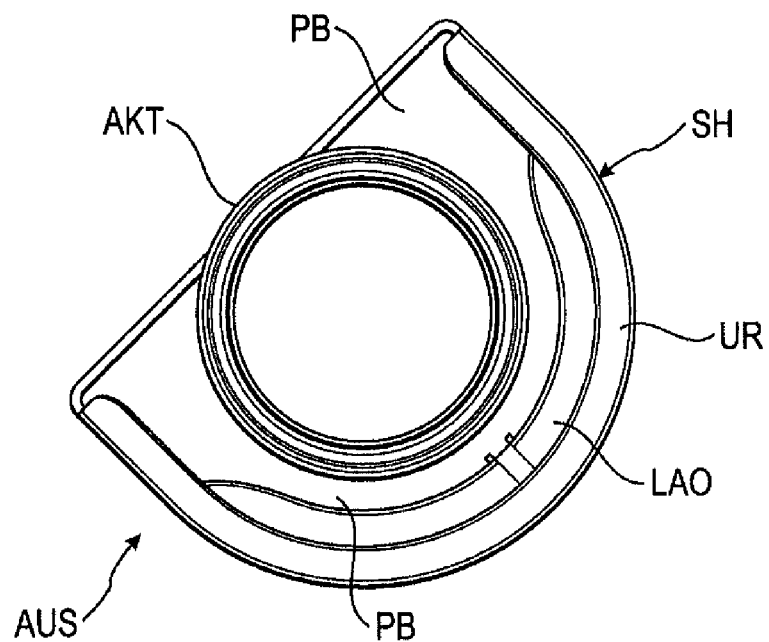

According to FIGS. 10, 13, 14, the outflow connector AKT which is connected to the outlet opening AO in the socket SO of the sorption container SB passes through the through-opening GK in the base BO preferably in a corner region EBR of the washing compartment SPB which lies outside the area of rotation swept over by the spray arm SA. This is illustrated in FIG. 2. Expressed in general terms, the outflow connecting piece AKT thus projects out of the base BO into the interior of the washing compartment SPB at a point which lies outside the area of rotation covered by the lower spray arm SA. The exhaust flue connector or outflow connector AKT is overlapped or covered over along its upper end portion by a spray protection hood SH. The spray protection hood SH covers over the outflow connector AKT in an umbrella-like or mushroom-like manner. This spray protection hood is, viewed from above (see FIG. 12) completely closed on the top side; it is also, in particular, completely closed on its underside in a region facing the spray arm SA. Here in the exemplary embodiment it has in a first approximation the geometric shape of a semicircular cylinder. The spray protection hood SH is represented schematically, viewed from above, in FIG. 12. On its top side, it has in the transition zones GF, URA between its largely planar top side and its essentially vertically downwardly projecting side walls (viewed from inside to outside) convexly curved flattened-off areas GF (see FIG. 13). If a spray jet from the spray arm SA strikes these transition zones GF, URA which are flattened off on the top edge or curved, then said spray jet spreads like a film largely over the full surface of the spray protection hood SH and cools this hood during the desorption process.

In order to prevent liquid reaching the sorption container SB through the outlet opening of the outflow connector AKT during spraying with the lower spray arm SA, a lower edge zone UR of the semicircular cylindrical section-like side wall of the spray protection hood SH is bent or arched inward toward the outflow connector AKT. This can be clearly seen in FIG. 13. In addition, a circumferential, radially outward-projecting spray water repelling element or shielding element PB, in particular a deflector plate, is provided in the region of the top edge of the outflow connector AKT. This extends radially outward into the intermediate space or gap between the circular-cylinder-shaped outflow connector AKT and the inner wall of the spray protection hood SH. At the same time, between the outer edge of this shielding element PB and the inner wall of the spray protection hood SH there remains a free through-opening for an air flow which flows out of the outflow connector AKT in the direction of the cover of the spray protection hood SH and in so doing is deflected downward to the lower edge UR of the spray protection hood SH, in particular by approximately 180°. The deflection path is denoted by ALS in FIG. 13. In the exemplary embodiment of FIG. 13 the outward-projecting shielding element PB is supported at individual points on the circumference of its outer edge by means of web elements SET opposite the inner wall of the side wall of the spray protection hood SH, forming a continuous circular segment section. The spray protection hood SH is disposed at a free vertical distance relative to the outlet connector AKT, thereby forming a free space or cavity.

FIG. 14 shows the spray protection hood SH viewed from below, together with the outflow connector AKT. In this case the shielding element PB shields the exit opening of the outflow connector AKT essentially all the way round as a laterally or sideways-projecting edge or web. In particular, the shielding element PB closes the underside of the spray protection hood SH in the region of the straight side wall facing the spray arm SA. A gap clearance LAO through which the air can flow out of the outflow connector AKT into the inside of the washing compartment SPB is left open only in the semicircular bent section of the spray protection hood SH between the shielding element PB and the outer, concentrically disposed side wall of the spray protection hood SH running radially offset from said shielding element. Here in the exemplary embodiment of FIG. 14 the gap clearance LAO is essentially sickle-shaped. The air flow LS2 is thereby forced along a deflection path ALS which deflects it downward from its vertical, upward-directed outflow direction, where it can exit only through the sickle-shaped circular segment gap clearance LAO in the lower region of the spray protection hood SH. The outflow connector AKT beneficially projects at such a height HO with respect to the base BO that its upper edge is higher than the level of a reference total wash tank volume or foam volume provided for a wash cycle.

The outflow element AUS which is installed at the outlet side of the sorption container SB and projects into the inside of the washing compartment SPB is therefore beneficially embodied in such a way that the air flow LS2 exiting it is directed away from the spray arm SA. In particular, the outflowing air flow LS2 is deflected into a rear or back corner region between the rear wall RW and the adjoining side wall SW of the washing compartment. In this way spray water or foam is largely prevented from reaching the interior of the sorption container through the opening of the outflow connector during the cleaning cycle or other wash cycle. The desorption process could be impaired or totally nullified in this way. In addition, sorption material could be permanently damaged by washing solution. Extensive tests have namely shown that the functional integrity of the sorption material in the sorption container can be largely maintained or preserved over the lifetime of the dishwasher if water, detergent and/or rinse aid in the washing solution are reliably prevented from reaching the sorption material.

In summary, at least one outflow device AUS which is connected to at least one outflow opening AO of the sorption container SB is disposed in the interior of the washing compartment SPB in such a way that air LS2 blown out from it is largely directed away from at least one spray device SA accommodated in the washing compartment SPB. In this arrangement the outflow device AUS is disposed outside the working area of the spray device SA. The spray device can be e.g. a rotating spray arm SA. The outflow device AUS is preferably provided in a rear corner region EBR between the rear wall RW and an adjacent side wall SW of the washing compartment SPB. The outflow device AUS has in particular an exhaust opening ABO at a vertical distance HO above the base BO of the washing compartment SPB, said exhaust opening being located higher than the level of a reference total wash-tank volume provided for a wash cycle. The outflow device AUS includes an outflow connector AKT and a spray protection hood SH. The spray protection hood SH has a geometric shape which overlaps the exhaust opening ABO of the outflow connector AKT. The spray protection hood SH is extended over the outflow connecting piece AKT such that air flowing up through the outflow connector AKT out of the sorption container SB with an ascending direction of flow can, after its exit from the exhaust opening ABO of the outflow connecting piece AKT, have a downward-directing forced flow path ALS impressed upon it. The upwardly projecting outflow connector AKT above the base BO of the washing compartment SPB is coupled to the terminal connector STE on the cover part DEL of the sorption container SB disposed under the base BO. The spray protection hood SH is, in its housing region GF facing the spray device SA, embodied in a closed manner both on the top and on the underside. The spray protection hood SH overlaps the exhaust opening ABO of the outflow connector AKT with an upper free space. The outflow connector AKT has an upper, outwardly arched edge or circumferential collar KR. The spray protection hood SH envelops an upper end section of the outflow connector AKT so as to form a gap clearance SPF between its inner wall and the outer wall of the outflow connector AKT. The gap clearance SPF between the spray protection hood SH and the outflow connector AKT is embodied such that an air outflow path ALS out of the outflow connector AKT is provided which is directed away from the spray device SA in the washing compartment SB. A spray water deflecting element PB projecting into the gap clearance SPF is provided on the outflow connector AKT. A lower edge zone UR of the spray protection hood SH is arched inwardly. The spray protection hood SH has a rounded outer surface such that it causes a spray jet from the spray device SA which strikes it to spread over its surface like a film.

Figure 15:
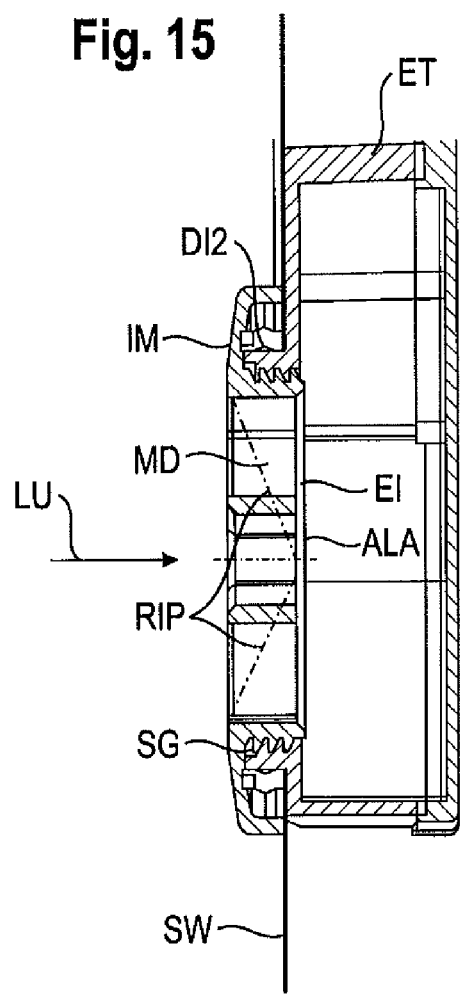
FIG. 15 shows a schematic sectional side view of the inlet element of the sorption drying system of FIGS. 1 to 3 as a detail.

FIG. 15 shows a schematic longitudinal sectional representation of the fixing arrangement of the inlet-side, frontal end section ET of the air ducting channel LK in the region of the outlet opening ALA in the side wall SW of the washing compartment SPB of FIG. 2. The frontal end section ET of the air ducting channel LK projects into the interior of the washing compartment SPB in such a way that a collar edge is formed circumferentially projecting perpendicularly in relation to the side wall SW. This collar edge has an internal thread SH. An annular inlet element IM with an external thread is screwed into this internal thread SG. It therefore functions as a fixing element for firmly holding the end section ET. This annular fixing element has a toroidal circumferential receiving chamber for a sealing element DI2. This sealing element DI2 seals an annular gap between the outer edge of the inlet-side frontal end section ET of the air ducting channel LK and the fixing element. Here in the exemplary embodiment the fixing element is formed in particular by a screw-cap-like threaded ring which is screwed to the inlet-side frontal end section ET of the air ducting channel LK. In the exemplary embodiment, the annular fixing element IM has a central through-passage MD through which air LU can be aspirated out of the interior of the washing compartment SPB.

It can possibly also be beneficial to provide in or in front of the inlet opening MD of the inlet-side tube section ET of the air ducting channel LK at least one rib-shaped engagement protection arrangement which has between its engagement ribs RIP freely passable continuous gaps for the inflow of air out of the washing compartment. These ribs RIP are indicated in FIG. 15 by dash-dotted lines.

Figure 16:
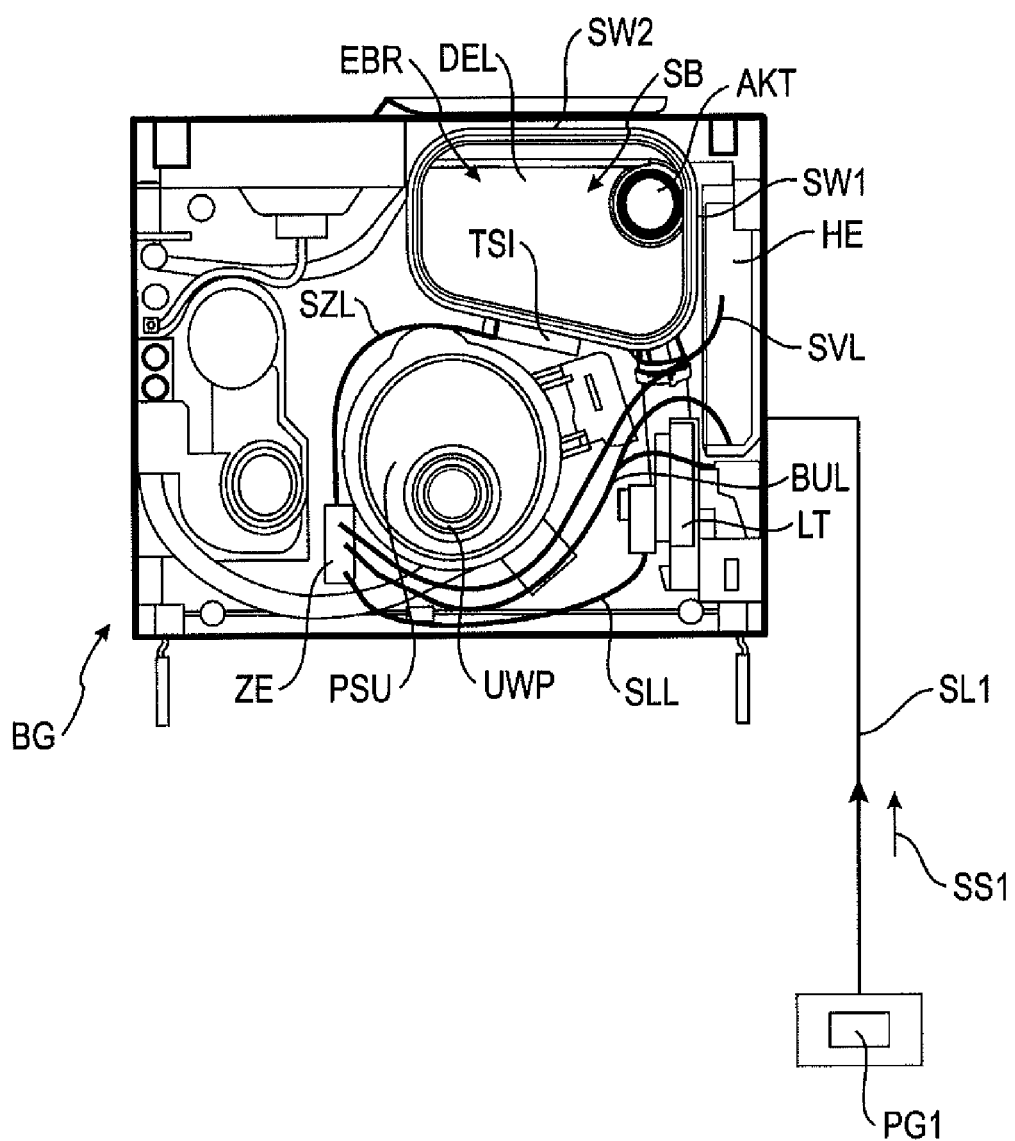
FIG. 16 shows a schematic plan view from above of the base assembly of the dishwasher of FIG. 1 and FIG. 2.

FIG. 16 shows in a schematic plan view the base assembly BG. It comprises in addition to the fan unit LT, the sorption container SB, the circulating pump UWP, etc. a main control device HE for the control and monitoring thereof. The heating device HZ of the sorption container SB is also regulated for the desorption process thereof by means of at least one control device. This control device is formed here in the exemplary embodiment by an additional control device ZE. It serves to interrupt or connect through the power supply line SZL to the heating device HZ as required. The additional control device ZE is controlled from the main control device HE via a bus line BUL. A power supply line SVL runs from the main control device HE to the additional control device ZE. This additional control device also controls the fan unit LT via a control line SLL. The power supply line to the fan unit LT can in particular also be integrated into the control line SLL.

Also connected to the main control device HE via a signal line is at least one temperature sensor TSE (see FIG. 2) which delivers corresponding measurement signals for the temperature in the interior of the washing compartment to the main control device. The temperature sensor TSE is suspended between stiffening ribs VR (see FIG. 3) in the intermediate space between the two arms of the inlet-end tube section RA1 of the air ducting channel LK. It is at the same time brought into contact with the side wall SW of the washing compartment SPB.

As soon as a cleaning cycle is now started, the main control device HE simultaneously switches on the additional control device ZE via the bus line BUL such that an electrical voltage is applied to the terminal pins AP1, AP2 of the heating device HZ via the power supply line SZL. As soon as a specific predefined upper temperature limit is reached in the interior of the washing compartment SPB, which the main control device HE can determine via the measurement signals of the temperature sensor, said main control device can give the instruction to the additional control device ZE via the bus line BUL to remove the voltage on the power supply line SZL and consequently completely disconnect the heating device HZ. In this way the desorption process for the sorption material in the sorption container can be terminated, for example.

It can possibly be beneficial to provide the option for an operator of the dishwasher to activate or deactivate the sorption drying system TS via the activation or deactivation of a specially provided program button or through appropriate selection of a program menu. This is illustrated schematically in FIG. 16 in that a program button or a program menu item PG1 is shown which gives appropriate activation or deactivation signals for switching the sorption drying system TE on or off via a control line SL1 by means of control signals SS1 to the control logic HE.

In particular, a first selection button for selecting an "Energy" or "Sorption operation" program variant can be provided in the operator control panel of the dishwasher. In this program the emphasis is on saving energy. This is achieved in that during the rinse cycle there is absolutely no heating by means of a continuous-flow heater, and the drying of the items to be washed, in particular the dishware, is achieved solely with the aid of the sorption drying system TS.

In particular, in addition to pure sorption drying it can be beneficial to heat the interior of the washing compartment by means of heated rinsing liquid during the rinse cycle. At the same time it can advantageously be sufficient if the transfer of heat to the washed items to be dried which is effected by means of the rinse cycle is achieved with a lower use of energy than is the case without sorption drying. Electrical heating energy can namely be saved through sorption of air humidity by means of the sorption drying system now employed. Improved drying of wet or damp items to be washed can therefore be achieved by means of what is termed "intrinsic heat drying" as well as by means of sorption drying, that is to say through a combination or addition of the two types of drying.

In addition to or independently of the "Energy" button, a further "Drying power" button which increases the blower operating time of the fan unit can be provided in the control panel of the dishwasher. Improved drying of all kitchenware items can be achieved by this means.

In addition to or independently of the above special buttons, a further "Program run time" button can be provided. When the sorption drying system is switched on, the program run time can be reduced compared with conventional drying systems (without sorption drying). Where appropriate, the run time during cleaning can be further shortened through additional heating in the cleaning phase and optionally by increasing the spray pressure by increasing the motor speed of the circulating pump. Furthermore, the drying time can also be further reduced by increasing the rinsing temperature.

In addition to or independently of the above-mentioned specific buttons, an operating button with the function "Influence the cleaning power" can be provided. When this button is actuated, the cleaning power can be increased while the run time remains the same, without energy consumption being increased by comparison with a dishwasher without sorption drying system. Heat energy for heating a desired total volume of liquid in the wash tank can namely be saved in that the sorption process is started at the same time as the cleaning cycle and as a result hot air that is loaded with a volume of water expelled from the sorption material passes into the washing compartment.

The invention claimed is:

1. A dishwasher, comprising:
 a washing compartment;
 a sorption drying system to dry items to be washed, the sorption drying system having a sorption container containing reversibly dehydratable sorption material;
 an air ducting channel to connect the sorption container with the washing compartment in order to generate an air flow, the air ducting channel having an inlet-side tube section;
 a heater positioned between the inlet-side tube section and the sorption material; and
 a flow conditioning element positioned between an inlet of the inlet-side tube section and the heater, the flow conditioning element having at least one air passage that controls an air flow through the sorption container in a throughflow direction of the sorption container, the air passage having a non-uniform cross section perpendicular to the throughflow direction,
 wherein the air flow through the sorption container is controlled by the air passage such that an equalization of a local flow cross-sectional profile of the air flow is achieved.

2. The dishwasher of claim 1, wherein the dishwasher is a domestic dishwasher,
 the dishwasher further comprises a fan unit that is inserted into the air ducting channel, and
 the flow conditioning element is arranged downstream of the fan unit.

3. The dishwasher of claim 1, wherein the sorption container has a lower cavity, and
 when viewed in the throughflow direction of the sorption container, the flow conditioning element is disposed in the lower cavity at a vertical distance ahead of the heater.

4. The dishwasher of claim 1, wherein the flow conditioning element is one of a slotted plate and a perforated plate.

5. The dishwasher of claim 4, wherein the flow conditioning element is disposed essentially parallel and with clearance relative to an air inlet cross-sectional area of a sorption unit of the sorption container.

6. The dishwasher of claim 4, wherein the cross section of the air passage of the flow conditioning element is larger at some locations than at other locations.

7. The dishwasher of claim 6, wherein the air passage is a plurality of slots.

8. The dishwasher of claim 1, wherein the heater is a coiled tubular heater that extends along a winding course,
 the air passage essentially follows the winding course of the coiled tubular heater, and
 the coiled tubular heater is arranged with clearance above the air passage.

9. The dishwasher of claim 1, wherein the heater is a coiled tubular heater that extends along a winding course, and
 the air passage is a plurality of slots that essentially follow the winding course of the coiled tubular heater.

10. The dishwasher of claim 9, wherein the coiled tubular heater is arranged with clearance above the slots.

11. The dishwasher of claim 10, wherein a width of the slots in a direction perpendicular to the throughflow direction is non-uniform.

12. The dishwasher of claim 9, wherein a width of the slots in a direction perpendicular to the throughflow direction is non-uniform.

13. A sorption drying system for use in a domestic dishwasher having a washing compartment, the sorption drying system being for drying items washed in the domestic dishwasher, the system comprising:
   a sorption container containing reversibly dehydratable sorption material;
   an air ducting channel to connect the sorption container with the washing compartment of the domestic dishwasher in order to generate an air flow, the air ducting channel having an inlet-side tube section;
   a heater positioned between the inlet-side tube section and the sorption material; and
   a flow conditioning element positioned between an inlet of the inlet-side tube section and the heater, the flow conditioning element having at least one air passage that controls an air flow through the sorption container in a throughflow direction of the sorption container, the air passage having a non-uniform cross section perpendicular to the throughflow direction,
   wherein the air flow through the sorption container is controlled by the air passage such that an equalization of a local flow cross-sectional profile of the air flow is achieved.

14. The system of claim 13, wherein the sorption container has a lower cavity, and
   when viewed in the throughflow direction of the sorption container, the flow conditioning element is disposed in the lower cavity at a vertical distance ahead of the heater.

15. The system of claim 14, wherein the heater is a coiled tubular heater that extends along a winding course,
   the air passage essentially follows the winding course of the coiled tubular heater, and
   the coiled tubular heater is arranged with clearance above the air passage.

16. The system of claim 13, wherein the flow conditioning element is one of a slotted plate and a perforated plate.

17. The system of claim 13, wherein the cross section of the air passage of the flow conditioning element is larger at some locations than at other locations.

18. The system of claim 17, wherein the air passage is a plurality of slots.

19. The system of claim 18, wherein a width of the slots in a direction perpendicular to the throughflow direction is non-uniform.

20. The system of claim 13, wherein the heater is a coiled tubular heater that extends along a winding course,
   the air passage essentially follows the winding course of the coiled tubular heater, and
   the coiled tubular heater is arranged with clearance above the air passage.

21. A dishwasher comprising:
   at least one washing compartment;
   at least one sorption drying system for drying items to be washed, the sorption drying system having
      at least one sorption container containing reversibly dehydratable sorption material, the at least one sorption container having at least one lower grid element, and at least one upper grid element located at a predefined vertical distance from the lower grid element;
   at least one air ducting channel connecting the sorption container to the washing compartment for the purpose of generating an air flow, the air ducting channel having an inlet-side tube section;
   at least one fan unit located in the air ducting channel; and
   one or more flow conditioning elements in the sorption container and/or in the inlet-side tube section of the air ducting channel, the one or more flow conditioning elements being located downstream of the at least one fan unit,
   wherein the one or more flow conditioning elements are provided with one or more air passages in such a way that an equalization of a local cross-sectional profile of the air flow is achieved when the air flows through the sorption container in a throughflow direction of the sorption container, the air passages having a non-uniform cross section perpendicular to the throughflow direction, and
   the one or more flow conditioning elements, the at least one lower grid, and the at least one upper grid are different elements.

22. The dishwasher of claim 21, wherein at least one of the one or more flow conditioning elements has a flow through surface, and
   a uniform volume of air passes through the flow through surface with a uniform flow velocity at every point of the flow through surface.

* * * * *